3,106,572
MANUFACTURE OF DIPHENYLMERCURY

Zvi Enrico Jolles, 35 Shamrock Way, Southgate, London, England, and Eric Victor Caldwell, 7 Grosvenor Gardens, Upminster, England
No Drawing. Filed Aug. 1, 1960, Ser. No. 46,392
Claims priority, application Great Britain Aug. 7, 1959
12 Claims. (Cl. 260—433)

The invention relates to the manufacture of diphenylmercury compounds and to a method whereby materials may be rendered permanently bacteriostatic, fungistatic or germicidal, and to certain selected products produced by such a method.

In addition to its potential uses in the manufacture of germicides, fungicides, herbicides and insecticides, diphenylmercury is a useful intermediate in the preparation of a number of organometallic compounds, some of which are otherwise difficult to produce or cannot be produced at all. The difficulty and high cost of making diphenylmercury by current methods very severely curtails its widespread commercial use. The primary object of the invention is an economical and convenient method of manufacturing diphenylmercury.

A further object of the invention is to produce diphenylmercury in situ, i.e. on or/and within certain materials, by a simple process and in a manner which in no way affects their structure and physical or mechanical properties, e.g. on textiles, jute, tent fabrics, sand-bags, leather, timber and the like, making them immune to attack by bacteria, fungi and other micro-organisms.

There are many known reactions that lead to the formation of diphenylmercury, but none, so far, has become of commercial importance, owing to low yields, or to the relatively high cost of the reagents employed, or to operational difficulties or to the combination of more than one of these factors.

It has now been discovered that, by the action of certain chelating agents in the presence of ammonium ions, phenylmercuric salts can undergo a type of disproportionation reaction giving rise to one mole of diphenylmercury and a mercury ion for every two moles of phenylmercuric salt. This disproportionation reaction takes place very readily at room temperature and in aqueous media giving rise to a precipitate of diphenylmercury in a high state of purity in high yield (in many instances over 90% of theoretical) and a mercury compound of the chelating agent which remains in solution. In contrast to the disproportionation reactions of prior art, the reaction now discovered proceeds almost quantitatively in the desired direction with only the stoichiometric amount of the chelating agent present. For example, whereas in the case of potassium iodide at least nine molar proportions of the complexing agent are required, according to the present invention, only one half molar proportion of the chelating agent is sufficient to accomplish the desired transformation.

Suitable chelating agents are ethylenediaminotetracetic acid (hereinafter referred to as EDTA) or other compounds of the same general type such as diethylene triaminopentacetate.

In one method of carrying out the invention, an ammonium salt of EDTA is mixed with a phenylmercuric compound as herein defined in an aqueous solution of ammonia and practically pure diphenylmercury (M.P. 126° C.) is precipitated with a yield of about 90% of the theoretical within a very short time.

In another method of carrying out the invention, an aqueous solution of phenylmercuric acetate is treated with one equivalent weight of an alkali metal hydroxide and to the thus formed phenylmercuric hydroxide in solution is added an ammonium salt of EDTA and diphenylmercury separates and settles on the bottom of the vessel in a very pure crystalline form.

In yet another method of carrying out the invention ammonia is added to a clear aqueous solution of a mixture of the phenylmercuric compound and a sodium salt of EDTA and after a short time, almost pure diphenylmercury settles out on the bottom of the vessel.

It is to be understood that the term "solution" includes a supersaturated solution, and also a saturated solution in equilibrium with undissolved solids.

The methods of carrying out the invention are illustrated in detail in the following examples:

Example 1

168 grams of phenylmercuric acetate (two molar proportions) were stirred into 8,000 ccs. of hot water in a 10 litre flask. While stirring, 28 grams of potassium hydroxide dissolved in 50 ccs. of water were added and the temperature was allowed to cool at about 50° C. At this stage 1125 ccs. of an ammoniacal solution of EDTA prepared from 74.5 grams (one molar proportion) of EDTA and 82.8 ccs. of concentrated (sp. gr. 0.88) ammonia (5.7 molar proportions) were added while stirring. The solid white precipitate which settled to the bottom of the flask was collected on a filter and washed with water. Yield of the dried product (M.P. 128–129° C.) was 79.4 grams corresponding to 89.7% of the theoretical. M. P. of the mixture with an authentic sample of diphenylmercury, 128–129° C. Hg percent found: 57.2% of the theoretical for $C_{12}H_{10}Hg$ which is 56.6%.

Example 2

To the phenylmercuric hydroxide solution, prepared as above from 168 grams phenylmercuric acetate, was added the tri-sodium salt of EDTA, prepared from 74.5 grams of EDTA and three equivalent weights of caustic soda. To the clear stirred solution were added 17 ccs. of concentrated ammonia (sp. g. 0.88), and after a few minutes a white precipitate separated which soon settled to the bottom. Stirring continued for a further half hour and the diphenylmercury was collected and washed as in the preceding example. The melting point of the product was 127° C., remaining unchanged when in admixture with an authentic sample of diphenylmercury.

Example 3

168 grams (2 molar proportions) of phenylmercury acetate was added with stirring to 3.5 litres of hot water containing 42.5 ccs. (3 molar proportions) of concentrated ammonia solution (sp. g. 0.88). When the temperature of this solution had fallen to 55° C. an ammonium detarate solution (i.e. a solution of ammonium ethylene-diamine tetra-acetate, EDTA) prepared earlier from 73.5 grams (1 molar proportion) of EDTA and 28.8 ccs. (2 molar proportions) of concentrated ammonia in 500 ccs. water, was added.

The diphenylmercury which precipitated was obtained in a yield of 88.5%. It contained 56.9% of mercury and melted at 126° C.

Example 4

100 grams of phenylmercury acetate (2 molar proportions) was added to a stirred solution of ammonia maintained at 90° C. which contained 26 ccs. (3 molar proportions) of concentrated ammonia in a litre of water. When the solution had cooled to 55° C. there was added, a solution of the tri-sodium salt of N - hydroxyethyldiamino-ethane tri-acetic acid (Detarol, F. W. Berk & Co. Ltd.) 117.5 ccs. (1 molar proportion) in 500 ccs. of water to which was then added 17.4 ccs. (2 molar proportions) of concentrated ammonia followed by 12.5 ccs. (1.5 molar proportions) of concentrated sulphuric acid.

The white precipitate which formed immediately was filtered off after two hours then washed and dried. Diphenylmercury (Hg 56.8% M.P.=126–127° C.) was obtained in 73.1% yield.

*Example 5*

100 grams of phenylmercury acetate (2 molar proportions) was added to a stirred solution of ammonia maintained at 90° C., which contained 26 ccs. (3 molar proportions) of concentrated ammonia in a litre of water. As in Example 4, a solution of the chelating agent was added when the temperature had fallen to 55° C. This solution contained 173 ccs. of the pentasodium salt of triaminodiethane pentacetic acid (Detarex PY, F. W. Berk & Co. Ltd.) (1 molar proportion), 17.4 ccs. ammonia (2 molar proportions) and 20.7 ccs. of concentrated sulphuric acid (2.5 molar proportions).

As in Example 4, a white precipitate formed immediately and diphenylmercury was obtained after filtration, washing and drying in an 84.6% yield (Hg=56.6%, M.P.=126–127° C.).

Diphenylmercury may be produced in situ on or within the body of certain materials by this method when it is desired to precipitate it on or within the body of certain materials from an aqueous solution, the said materials being thus protected from germs, fungus, weeds and insects. Examples of such materials are cotton fabric, jute, tent fabric, sand-bags, leather goods and timber.

What we claim is:

1. A method of manufacturing diphenylmercury which comprises interacting, in an ammoniacal solution, phenylmercury hydroxide with a chelating agent selected from the group consisting of ethylene diamine tetraacetic acid, N-hydroxy ethyldiamino-ethane triacetic acid and triamino diethane pentacetic acid and the alkali metal salts of said acids including ammonium salts.

2. A method of manufacturing diphenylmercury as defined in claim 1 wherein the phenylmercuric hydroxide is formed from an ammoniacal solution of phenylmercury acetate and is then added to a solution of the trisodium salt of N-hydroxy-ethyldiamino-ethane tri-acetic acid to which is then added concentrated ammonia followed by concentrated sulphuric acid.

3. A method of manufacturing diphenyl mercury as defined in claim 1 in which the chelating agent is ethylenediaminotetraacetic acid.

4. A method of manufacturing diphenyl mercury as defined in claim 1 in which the chelating agent is diethylene triaminopentacetic acid.

5. A method of manufacturing diphenyl mercury as defined in claim 3 in which a salt of ethylenediaminotetraacetic acid is reacted with the phenyl mercury compound in an aqueous solution.

6. A method of manufacturing diphenyl mercury as defined in claim 5 in which the salt is the ammonium salt of ethylenediaminotetraacetic acid.

7. A method of manufacturing diphenyl mercury as defined in claim 1 wherein an aqueous solution of phenyl mercury acetate is treated with an alkali metal hydroxide and an ammonium salt of ethylenediaminotetraacetic acid is added to the phenyl mercuric hydroxide formed in solution.

8. A method of manufacturing diphenyl mercury as defined in claim 1 wherein ammonia is added to a clear solution of a mixture of phenylmercury compound and a sodium salt of ethylenediaminotetraacetic acid.

9. A method of manufacturing diphenyl mercury as defined in claim 7 wherein an aqueous solution of the alkali metal hydroxide is added to an aqueous solution of 2 moles of phenyl mercury acetate followed by one mole of ethylenediaminotetraacetic acid in an ammoniacal solution.

10. A method of manufacturing diphenyl mercury as defined in claim 7 wherein the aqueous solution of phenyl mercury acetate is treated with one equivalent weight of the alkali metal hydroxide.

11. A method of manufacturing diphenyl mercury as defined in claim 1 wherein an aqueous solution containing one mole of ethylenediaminotetraacetic acid and two moles of ammonia is added to a solution of two moles of phenyl mercury acetate, and three moles of ammonia.

12. A method of manufacturing diphenyl mercury as defined in claim 1 wherein a solution containing an acidified solution of an alkali metal salt of triaminodiethane pentacetic acid is added to an ammoniacal solution of phenyl mercury acetate.

References Cited in the file of this patent

UNITED STATES PATENTS

| | | |
|---|---|---|
| 2,503,841 | Pritchard | Apr. 11, 1950 |
| 2,524,547 | Sowa | Oct. 3, 1950 |
| 2,628,241 | Kobe et al. | Feb. 10, 1953 |
| 2,637,677 | Dinerstein | May 5, 1953 |

OTHER REFERENCES

Chem. Abstracts, vol. 48, No. 11, 1954, p. 6391.